United States Patent
Dunsch et al.

(10) Patent No.: US 7,799,109 B2
(45) Date of Patent: Sep. 21, 2010

(54) DEVICE FOR SEPARATING A GAS-LIQUID MIXTURE

(75) Inventors: Robert Dunsch, Vaihingen (DE);
Andreas Enderich, Esslingen (DE);
Leszek Goerlich, Leonburg (DE);
Stefan Ruppel, Mannheim (DE); Yakup Özkaya, Kornwestheim (DE)

(73) Assignee: MAHLE International GmbH, Stuttgart (DE)

( * ) Notice: Subject to any disclaimer, the term of this patent is extended or adjusted under 35 U.S.C. 154(b) by 474 days.

(21) Appl. No.: 11/883,594

(22) PCT Filed: May 29, 2006

(86) PCT No.: PCT/DE2006/000914

§ 371 (c)(1),
(2), (4) Date: Aug. 2, 2007

(87) PCT Pub. No.: WO2007/028351

PCT Pub. Date: Mar. 15, 2007

(65) Prior Publication Data

US 2008/0155949 A1 Jul. 3, 2008

(30) Foreign Application Priority Data

Sep. 6, 2005 (DE) .................. 10 2005 042 286

(51) Int. Cl.
*B01D 45/08* (2006.01)

(52) U.S. Cl. .......... 55/462; 55/385.3; 55/DIG. 14; 55/DIG. 19; 55/465; 55/445; 55/446; 123/572; 123/573; 123/574; 123/41.86; 123/198 E (58) Field of Classification Search .............. 55/385.3, 55/DIG. 19, DIG. 14, 462, 465, 445, 446; 123/572, 573, 41.86, 574, 198 E
See application file for complete search history.

(56) References Cited

U.S. PATENT DOCUMENTS

| 1,548,288 A | 12/1921 | Smith |
| 3,201,925 A | 8/1965 | Shada |

(Continued)

FOREIGN PATENT DOCUMENTS

CH 127 029 A 8/1928

(Continued)

OTHER PUBLICATIONS

International Search Report.

*Primary Examiner*—Jason M Greene
*Assistant Examiner*—Dung Bui
(74) *Attorney, Agent, or Firm*—Collard & Roe, P.C.

(57) ABSTRACT

The invention relates to a device for separating a gas-liquid mixture, in which the liquid portion exists in the form of small particles, especially for ventilating a crankcase of an internal combustion engine, by separating and coagulating the liquid particles on a target area. The liquid mixture, after acceleration in acceleration openings provided for this purpose, impacts the target area at an approximately right angle. The aim of the invention is to improve the aforementioned device in such a manner that it allows as high a degree of separation as possible for different sized volume flows of mixtures. For this purpose, the number and/or the cross-sections of the acceleration openings is varied, depending on the volume flow of mixtures, between a small complete cross-section for a low volume flow and a large complete cross-section for a large volume flow.

11 Claims, 7 Drawing Sheets

U.S. PATENT DOCUMENTS

| | | |
|---|---|---|
| 6,290,738 B1 | 9/2001 | Holm |
| 6,797,040 B2 | 9/2004 | Lenzing |
| 7,080,636 B2 | 7/2006 | Knaus et al. |
| 2001/0005986 A1* | 7/2001 | Matsubara et al. ......... 55/459.1 |
| 2006/0059875 A1 | 3/2006 | Malgorn et al. |
| 2006/0062699 A1 | 3/2006 | Evenstad et al. |
| 2006/0090737 A1* | 5/2006 | Pietschner .................. 123/572 |

FOREIGN PATENT DOCUMENTS

| | | |
|---|---|---|
| DE | 1 544 126 | 6/1969 |
| DE | 100 51 307 A1 | 5/2002 |
| DE | 103 20 215 A1 | 12/2004 |
| DE | 10 2005 043 198 A1 | 3/2006 |
| EP | 1 477 641 A1 | 11/2004 |

* cited by examiner

DEVICE FOR SEPARATING A GAS-LIQUID MIXTURE

CROSS REFERENCE TO RELATED APPLICATIONS

Applicants claim priority under 35 U.S.C. §119 of German Application No. 10 2005 042 286.1 filed Sep. 6, 2005. Applicants also claim priority under 35 U.S.C. §365 of PCT/DE2006/000914 filed May 29, 2006. The international application under PCT article 21(2) was not published in English.

The invention relates to a device for separating a gas-liquid mixture, in particular in ventilating a crankcase of an internal combustion engine.

Such a device is known from U.S. Pat. No. 6,290,738 B1. With this known device, the mixture flows through the individual acceleration openings at the same speed for all the acceleration openings, independently of the size of the total volume flows through each opening, this speed being low when the total volume flow is low and being larger accordingly when the total volume flow is large. Since the degree of separation varies with different impact speeds, the separation efficiency varies depending on the volume flow of the mixture prevailing as a function of operation. The separation efficiency of this known device is poor at low volume flows of the operating mixture.

With a generic device which receives volume flows that differ greatly in size due to operation, the present invention relates to the problem of being able to achieve the highest possible degree of separation even with low volume flows in such a device, which must be designed in terms of capacity for the maximum volume flow, which is relatively great.

This problem is solved by the invention.

Advantageous and expedient embodiments are the subject of the subclaims.

The present invention is based on the general idea of reducing the size of the impingement surface required for operation of the device with a maximum volume flow of the mixture, with the flow of mixture that is to be separated acting only partially on the impingement surface when the volume flow is low and/or reducing the cross section of the acceleration openings accordingly to increase the velocity of flow to be created in these openings. Devices with which this can be achieved extremely advantageously and expediently are the subject of the subclaims.

In a first embodiment of such a device a connecting arm-slide valve device is provided, by means of which the velocity of flow through at least a portion of the acceleration openings can be varied, namely between a completely closed state and a completely opened state of these acceleration openings. One portion of the acceleration openings are expediently situated exclusively in the area of the connecting arm and cannot be varied by the slide valve, which cooperates with this connecting arm. Another portion of the acceleration openings are situated in proximity to the connecting arm in which the cross section of the openings can be varied in size by the slide valve assigned to this connecting arm, depending on its shift position. This slide valve has openings, which can be assigned to the respective openings in the connecting arm to form a continuous acceleration opening. Depending on the extent to which these openings in the slide valve are assigned to the respective openings in the connecting arm for flow through the openings, the slide valve position determines the size of the volume flow through these acceleration openings.

To achieve the best possible degree of separation with volume flows that vary as a result of operation, the inventive device is operated as follows:

At low volume flow, a slide valve position is assumed up to a predetermined upper volume flow limit, such that all the acceleration openings that can be controlled by the slide valve are closed at this position. In this way, the total volume flow must pass through the acceleration openings that cannot be controlled in size, namely being limited to an area of the impingement surface assigned to these acceleration openings. The gas-liquid mixture to be separated is thereby guided onto the impingement surface at a relatively high impact speed, so that a good separation can be achieved. With an increase in volume flow, the additional flow-through acceleration openings, which are needed to reduce a pressure drop that is too great within the separation device, additional acceleration openings are controlled by the slide valve accordingly.

The position of the slide valve may be determined by a control device that operates as a function of the pressure prevailing immediately upstream from the slide valve. Thus, automatic regulation of the optimum slide valve position in each case is possible by a simple method.

In an alternative embodiment without a slide valve, valves designed with a closing characteristic that allows opening of these valves only after exceeding a predetermined differential pressure are provided in a portion of the acceleration openings. With this device, the number and optionally the size of the individual flow cross sections of the acceleration openings are established in accordance with the operating conditions, such that only a few acceleration openings are effective at a low total volume flow to achieve high individual impact speeds, whereas the number and total area of the acceleration openings increase with an increase in the total volume flow.

In a particularly advantageous embodiment of the inventive device, the at least one acceleration opening is situated in a cylindrical housing wall whereby at least one acceleration opening is controllable by an axially displaceable sealing element with respect to the size of its free flow cross section. The acceleration openings are radially opposite the cylindrical housing wall in which they are situated, arranged at a distance from an impingement ring wall for fluid separation. The impingement wall is advantageously porous and/or covered with a knit fiber material, in particular a nonwoven, to thereby improve the fluid separation.

In this embodiment, the cylindrical housing wall and the sealing element correspond to the connecting arm on the one hand and the slide valve on the other hand.

Advantageous and expedient embodiments of the invention to which a number of the subclaims are specifically directed are depicted in schematic form in the drawings and are explained in greater detail below.

FIG. 1

Figure 1A:
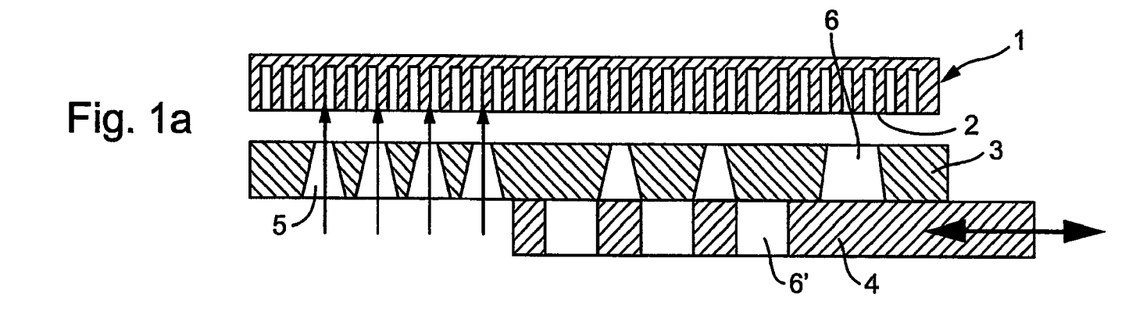
FIGS. 1a, 1b, 1c shows an adjustable connecting arm-slide valve mechanism with different slide valve settings A through C.
Figure 1B:
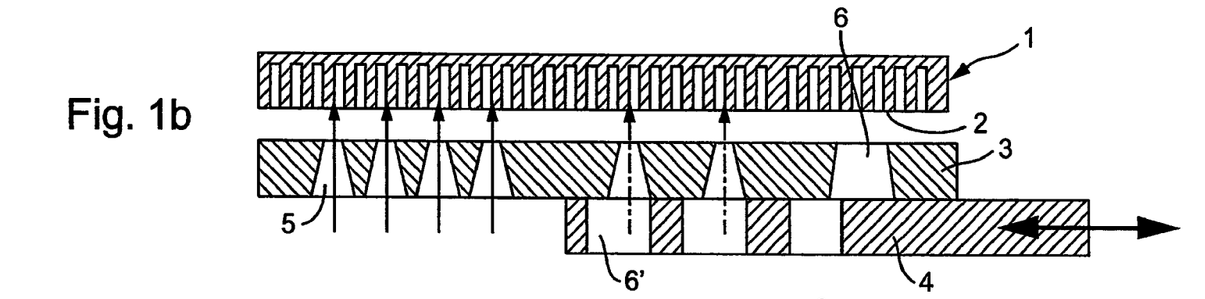
Figure 1C:
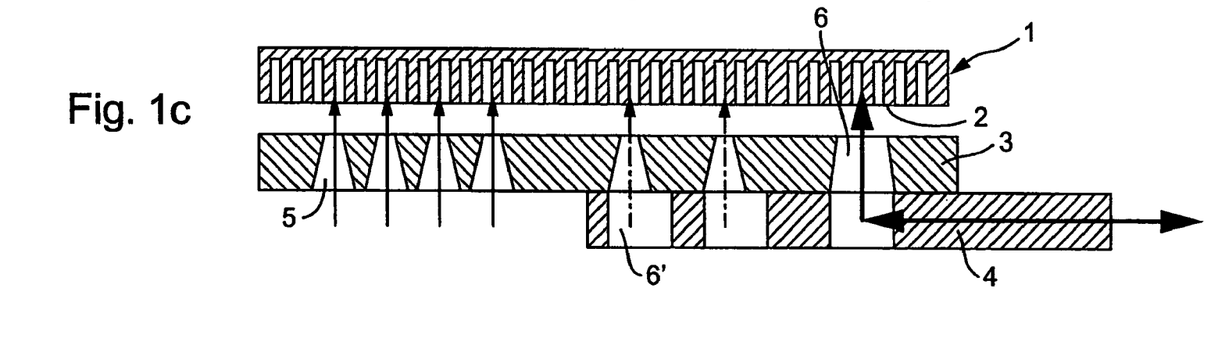

A separation device in an embodiment according to FIG. 1 includes an impingement element 1. This impingement element 1 has a plate-shaped design with an impingement surface acted upon by baffles 2 arranged like webs.

A device consisting of a connecting arm 3 and a slide valve 4 assigned to it is allocated to the impingement element 1 at a slight distance. First and second acceleration openings 5, 6 are provided in the connecting arm 3. Openings 6' in the slide valve 4 are allocated to the second acceleration openings 6. The slide valve 4 may be shifted in such a way that the second openings 6 of the connecting arm 3 are closed or opened. In the opened state of the second acceleration openings 6, the slide valve openings 6' either partially or completely release the flow cross sections of the second acceleration openings 6. These openings 6 are arranged in the slide valve 4 in such a way that, depending on the position of the slide valve, a portion of the second acceleration openings 6 may be opened and another portion may be closed, with intermediate positions also being possible. In the position of the slide valve 4 according to FIG. 1a, only the first acceleration openings 5 are opened, while all the second acceleration openings 6 are closed. This state is activated at low volume flows of liquid-gas mixtures to be separated in order to achieve the highest possible impact speeds of the liquid-gas mixture in a limited area of the impingement surface of the impingement element 1. When a few individual volume flows of a high speed act on such a limited area of the impingement element 1, they guarantee an optimal degree of separation.

In the switch position of the slide valve 4 according to FIG. 1b, a portion of the second acceleration openings 6 are switched to be completely open while the second portion are switched with only a partial area.

In the switch position of the slide valve 4 according to FIG. 1c, all the acceleration openings 5, 6 are completely opened. This switch state prevails with a maximum mixed volume flow due to the operation, i.e., at a mixed volume flow for which the device is maximally designed.

FIG. 2

Figure 2A:
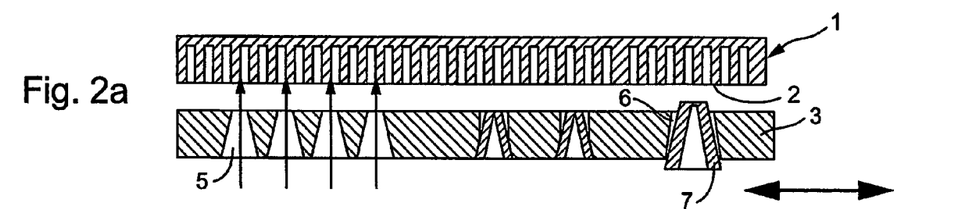
FIGS. 2a, 2b, 2c shows a connecting arm mechanism without a slide valve having valves that open as a function of the differential pressure in a portion of the acceleration openings.
Figure 2B:
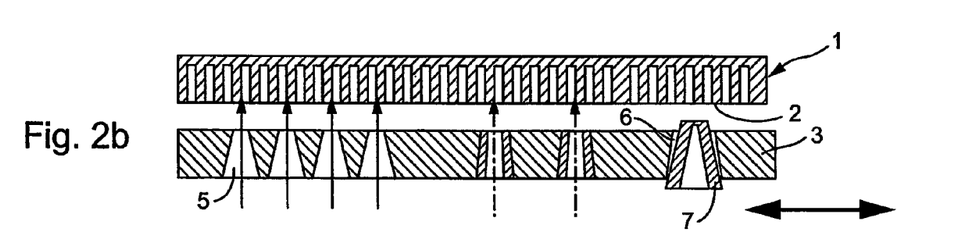
Figure 2C:
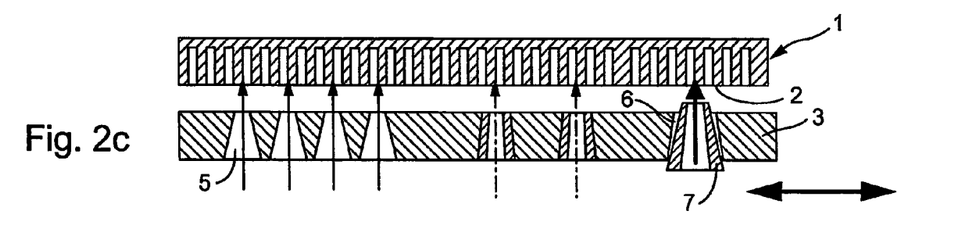

In the embodiment according to FIG. 2, the slide valve 4 of the device according to FIG. 1 is functionally replaced by valves 7 inserted into the second openings 6. These valves 7 are valves which open automatically as a function of the differential pressure. Valves 7 are designed to open only when a predetermined differential pressure is exceeded.

Valves which open only at predetermined differential pressures of different amounts may be installed in the individual second acceleration openings 6. A design in which more valves 7 open with an increase in the volume flow of the mixture and thus an increasing differential pressure on the acceleration openings is possible in a simple manner. Such valves 7 are essentially known in the state of the art and may be designed, for example, as so-called lip valves. The valves in the individual subfigures of FIG. 2 are shown in different closed and opened states. The individual subfigures a through c each show device states with increasing differential pressures at the acceleration openings 5, 6.

The arrows in the acceleration openings 5, 6 in FIGS. 1 and 2 are flow arrows indicating the individual flows of mixture through the individual acceleration openings 5, 6.

The illustration of the inventive device is merely a schematic type, where the devices shown may be part of a separation device according to U.S. Pat. No. 6,290,738 B1, which was cited as the state of the art in the introduction.

FIG. 3

Figure 3:
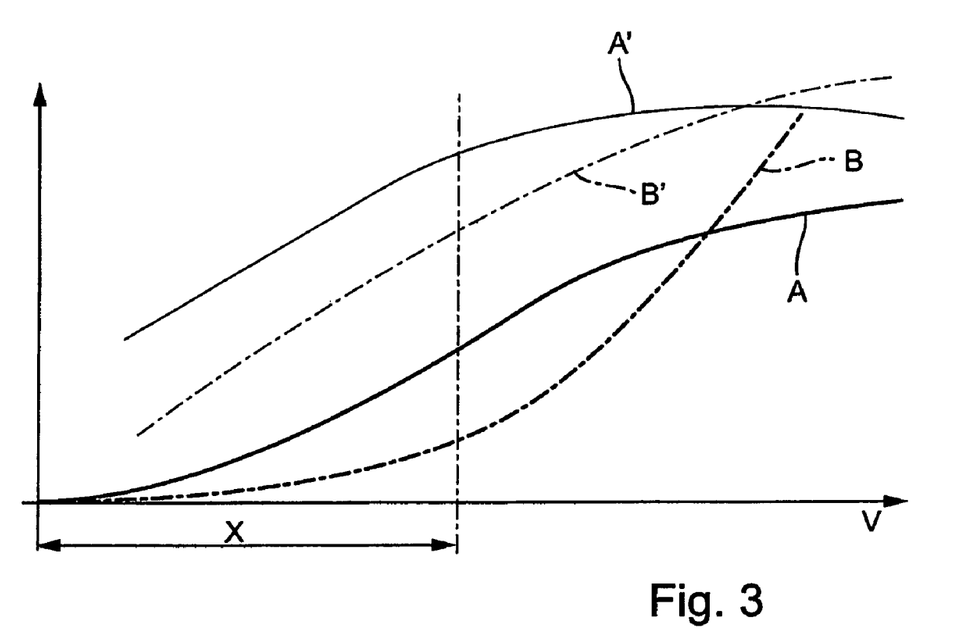
FIG. 3 shows a separation comparison diagram for a volume-controlled separation device on the one hand and an uncontrolled separation device on the other hand.

The differential pressures upstream and downstream from the acceleration openings 5, 6 on the one hand and on the other hand the respective degrees of separation for a volume-controlled device and an uncontrolled device on the other hand are shown in comparison with one another in the diagram according to FIG. 3 as a function of the liquid-gas volume flow V plotted on the abscissa.

The solid lines A, B show the respective differential pressures and the curves A' and B' show the respective degrees of separation, namely lines A and A' show the degrees of separation achieved with respect to a volume-controlled device and lines B, B' with respect to an uncontrolled device. This comparison shows quite clearly an increase in the degree of separation at low volume flows for volume-controlled separation devices, i.e., separation devices with which the highest possible differential pressures prevail at the acceleration openings at low volume flows, to which end only a limited number of the total acceleration openings 5 and 6 that are present are switched to allow flow to pass through them when the volume flow is low.

The volume flow in the actual working range is entered as X in the diagram. Volume flows going beyond this usually extend into the safety margin which follows. The slope of the degree of separation, which is clearly discernible in the working range and can be achieved by an inventive device, is therefore important.

FIG. 4

Figure 4A:
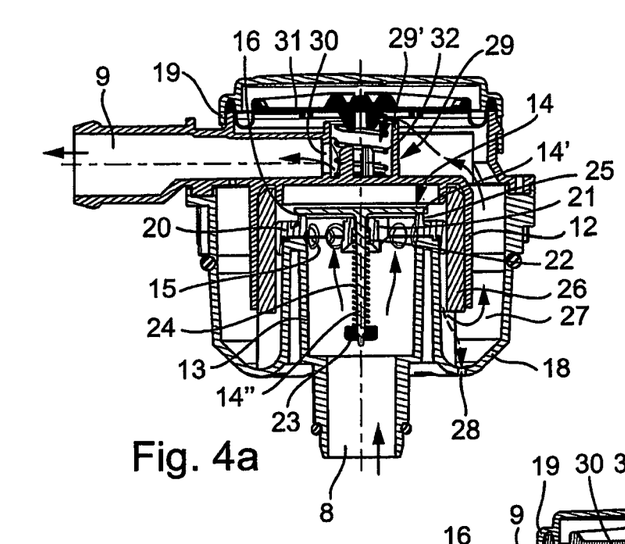
FIGS. 4a, 4b, 4c shows a separation device of a different design in which the acceleration openings are situated in a cylindrical housing wall in three different sectional views according to subfigures a through c.
Figure 4B:
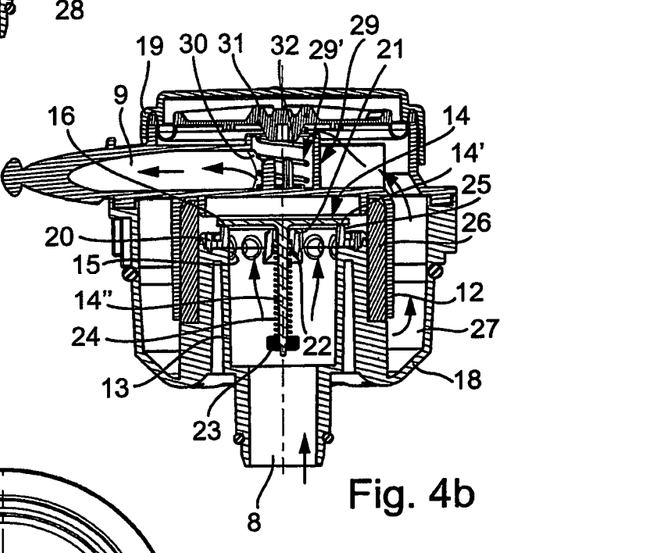
Figure 4C:
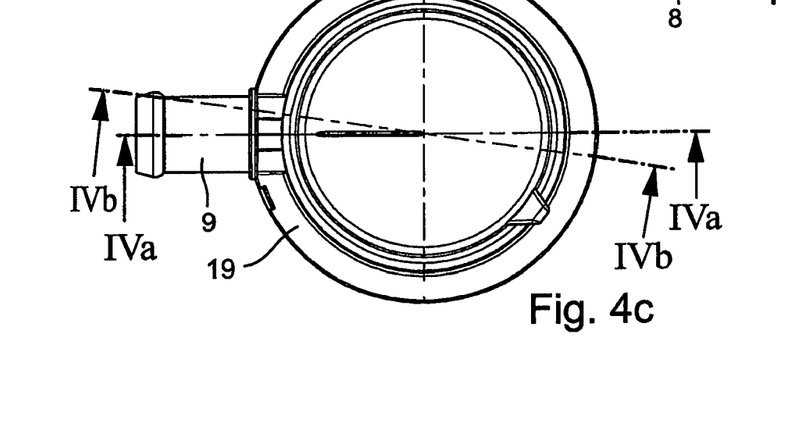

Specifically, an oil mist separator of an internal combustion engine of a motor vehicle is shown as the gas-liquid separation device in FIG. 4. With this oil mist separator, oil mist from the crankcase (not shown) of an internal combustion engine is drawn in through an intake channel 8, whereby the air flow remaining after separation of the oil mist particles leaves the device designed as an oil mist separator through the outlet channel 9. The oil mist and/or the air ultimately freed of oil droplets flow(s) through the separation device itself on a flow path marked with solid-line arrows in the diagram. Oil droplets that are separated leave the device in a liquid stream, indicated by an uninterrupted arrow. Specifically, the flow-through and separation of the oil mist flow within the separation device are described in greater detail below.

The aforementioned flow arrows are plotted only in subfigure 1a of FIG. 1.

The actual core of the separation device comprises a cylindrical housing wall 13 with different first and second acceleration openings 15, 16, a sealing element 14 and an impingement ring wall 12 belonging to the acceleration openings 15, 16. In the embodiments according to FIGS. 1 and 2, the components with reference numerals 2 through 6, each of them reduced by subtracting the number 10, correspond to the aforementioned components 12 through 16 in the embodiments according to FIGS. 1 and 2.

The cylindrical housing wall 13 is designed almost completely as a one-piece component of a bottom part 18 of an oil mist separator consisting on the whole of a top part 19 and a bottom part 18. On the axial outflow end of the cylindrical housing wall 13, a row of first acceleration openings 15 are provided, these openings being distributed around the circumference, each with radial opening axes opposite the axis of the cylindrical wall 13. To simplify the production of the first acceleration openings 15 inside the cylindrical housing wall 13 of the bottom part 18, which may be molded of plastic, the acceleration openings 15 are situated in a borderline area between an attachment part 20 and the area of the cylindrical housing wall 13 situated within and in one piece with the bottom part. The attachment part 20 is fixedly and tightly connected to the adjacent area of the cylindrical housing wall 13. Partial areas of the first acceleration openings 15 are provided in the attachment part 20 on the one hand and the cylindrical housing wall 13 on the other hand, forming the first acceleration openings 15 that are closed on the circumference after joining the two parts 20 and 13. A bearing 22 for the sealing element 14 is held in the attachment part by radial struts 21.

The sealing element 14 consists of a disk-shaped plate 14' and a rod 14" protruding at a right angle from the center thereof. An abutment 23 is situated on the end of the rod 14" facing away from the disk-shaped plate 14'. A helical spring 22 is stretched between the abutment 23 and the bearing 22. The disk-shaped plate 14' is pressed by the force of the helical spring 24 against an adjacent ring-shaped end edge 25 of the cylindrical housing wall 13. If the force acting on the disk-shaped plate 14' is greater than the helical spring force directed in the opposite direction from that of the helical spring 24, the disk-shaped plate 14' is lifted up from the ring-shaped end edge 25. This forms a radial ring gap between the disk-shaped plate 14' and the ring-shaped end edge 25 of the cylindrical housing wall 13. This ring gap represents a circumferential second acceleration opening 16 that is controllable with respect to its gap width. The sealing element 14 thus acts functionally like a valve 7 according to the separation device according to FIGS. 1 and 2. The force which induces opening of the sealing element 14 is created by a partial vacuum that is applied to the separator during operation of the oil mist separator. The force of the helical spring 24 is to be designed so that, depending on the possible vacuum operating states, the second acceleration opening 16 running radially, i.e., the respective ring gap, is opened to a greater or lesser extent, namely between a definable maximum value and the sealing state, depending on the possible vacuum operating states.

The cylindrical housing wall 13 is surrounded on the outside radially at a distance by an impingement ring wall 12.

This impingement ring wall 12 is a one-piece component of the top part 19 of the oil mist separator housing. A nonwoven 26 as a separation aid for oil droplets to be separated within the impingement ring wall 12 is situated on the inside circumference of the impingement ring wall 12 in an annular space between the impingement ring wall 12 and the outside circumference of the cylindrical housing wall 13. There is an annular space 27 between the outside wall of the cylindrical housing 13 together with the impingement ring wall 12 on the one hand and the outside wall of the separation housing on the other hand, which consists of the bottom part 18 and the top part 19 connected to the former. At the bottom of this annular space 27, there is a drain opening 28 for oil separated in the oil mist separator 27.

The outlet channel 9 and parts of a pressure regulating valve 29 are integrally molded in one piece with the top part 19. The area of the pressure regulating valve 29 integrated into the top part 19 is designed as a cup 29' with a closed bottom. Radially this cup area has a connecting opening 30 to the outlet channel 9. The axially open area of the pressure regulating valve cup 29' facing away from the closed bottom of the cup 29' acts together with a diaphragm 31 that is part of the pressure regulating valve 29. The diaphragm 31 is supported radially on the outside in a top part 19. This diaphragm 31 forms a movable bordering wall between the interior, which can be acted upon by a vacuum, of the oil mist separator and the atmosphere. The pressure regulating valve 29 is held in a completely opened state on the diaphragm 31, i.e., the diaphragm is not in sealing contact with the end face of the cup 29' of the pressure regulating valve 29, with the help of a helical spring 32 mounted and supported in the cup 29' of the pressure regulating valve 29. The spring force of the helical spring 32 is designed so that the pressure regulating valve 29 closes only after a preselectable vacuum limit is exceeded within the oil mist separator.

The functioning of the oil mist separator, the design of which is described above, is explained below.

When a vacuum is applied to the outlet channel 9 with respect to a crankcase (not shown in the drawing) of an internal combustion engine to which the intake channel 8 is connected, the exhaust gas flows through the oil mist separator in the manner indicated by the arrows. At a low vacuum, i.e., at a low volume flow, the second acceleration opening 16, which can be controlled by the sealing element 14, is closed, i.e., the oil mist flows only through the first acceleration openings 15. The respective oil mist stream coming out of the first acceleration openings 15 strikes the nonwoven 26 of the impingement ring wall 12. Within the nonwoven 26 the oil component coagulates out of the oil mist, to then be able to fall downward into the annular space 27 of the oil mist separator, while the air that has been freed of oil to this extent can flow to the outlet channel 9. Whether the oil mist can actually flow through the oil mist separator depends on the vacuum applied to the outlet channel 9. If the vacuum in the outlet channel 9 rises above a predetermined limit, the pressure regulating valve 29 closes. This avoids an unwanted or inadmissibly high vacuum prevailing unintentionally in the crankcase of the internal combustion engine which has a flow connection to the intake channel 8.

If a high, but not an inadmissibly high, vacuum prevails above a preselectable limit within the oil mist separator, the sealing element 14 opens, so that in addition to the flow cross sections of the first acceleration openings 15, the second acceleration opening 16 becomes active with regard to flow. The flow cross section of the second acceleration opening 16 is determined by the size of the vacuum, i.e., the difference between the vacuum and the opposing force of the helical spring 24 on the disk-shaped plate 14'. Due to the controllability of the flow cross section of the second acceleration opening 16 running radially, the velocity of flow in the acceleration openings 15 and 16 can be kept at a relatively constant level despite the differences in the total volume flows of the oil mist from a separation standpoint due to differences in operation.

FIG. 5

Figure 5:
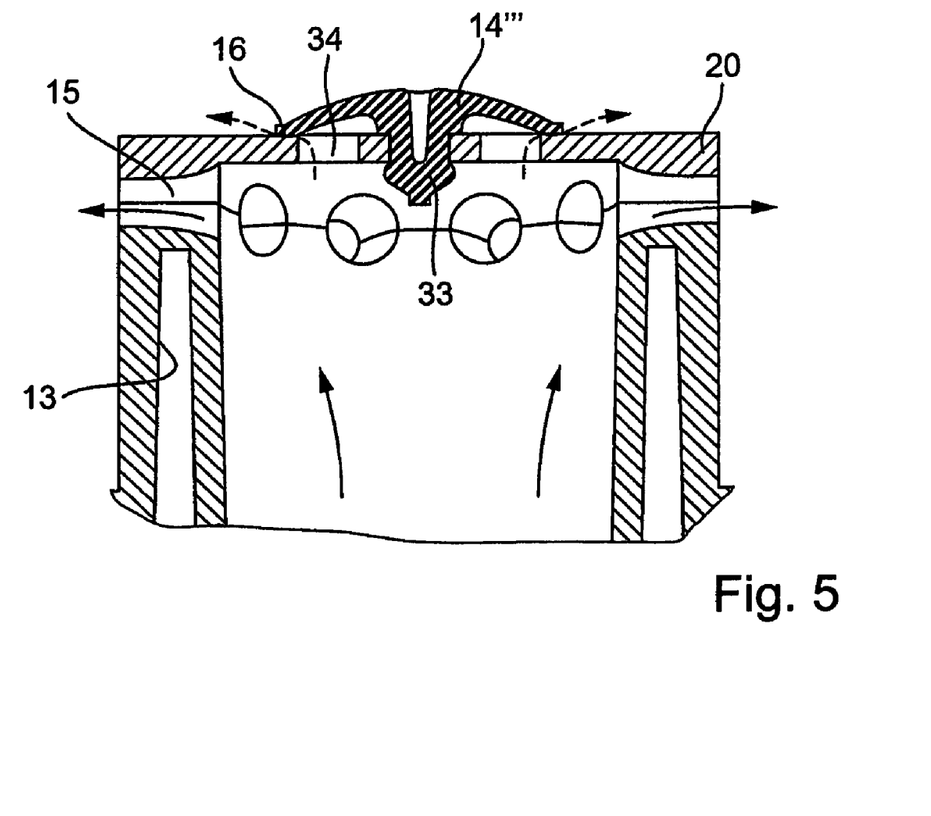
FIG. 5 shows a device having a basic design according to that in FIG. 4 with a cylindrical housing wall of an alternative design containing the acceleration openings—shown only as a detail here.

The difference between the embodiment according to FIG. 5 and the embodiment according to FIG. 4 consists exclusively of the design and the opening mechanism of the second acceleration opening 16, the cross section of which can be controlled. FIG. 5 therefore also shows a detail of this area alone. The sealing element 14 according to FIG. 5 has a diaphragm 14''' with an integrally molded bearing foot 33. The attachment part 20 in the embodiment according to FIG. 5 is a sealing disk on the end face axially with respect to the interior of the cylindrical housing wall 13. Axial through-openings 34 are provided in this sealing disk, so that they can be covered by the diaphragm 14'''. The function of the helical spring 24 of the sealing element 14 according to the embodiment in FIG. 4 corresponds to the elastic tensile force of the diaphragm 14''' in FIG. 5. In the embodiment according to FIG. 5, the second acceleration opening 16 running peripherally radially is formed by lifting the outer circumferential edge of the diaphragm 14''' with respect to the sealing disk formed by the attachment part 20.

FIG. 6

Figure 6:
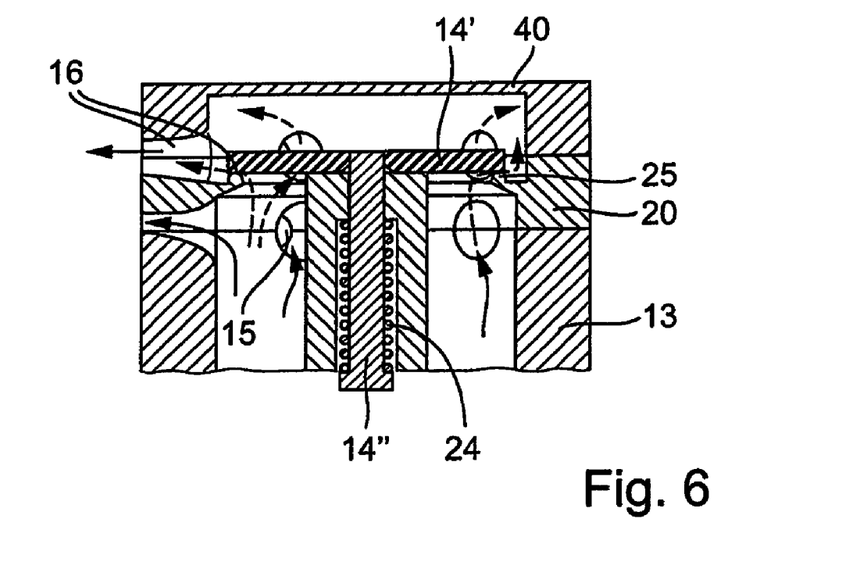
FIG. 6 shows yet another design of the cylindrical housing wall in comparison with the embodiment according to FIG. 5—again shown only as a detail, FIG. 7a, b; 8a, b show two other modified cylindrical housing walls again shown only as details—in comparison with the embodiments according to FIGS. 5 and 6, each shown as longitudinal sections in subfigures (a) and top views in subfigures (b).

The embodiment according to FIG. 6 differs from that according to FIG. 4 only in the area in which there is already a difference in the embodiment according to FIG. 5 in comparison with the embodiment according to FIG. 4.

The disk-shaped plate 14' is covered here by a cap 40, which is fixedly connected to the cylindrical housing wall 13 by an attachment part 20 that is already present in the previous embodiments. Nozzle-like second acceleration openings 16 are provided in this cap 40 as well as the adjacent attachment part 20 for a common design. These nozzle-like acceleration openings 16 follow downstream from the radial slot opening that can be controlled directly by the disk-shaped plate 14'. In the embodiment according to FIG. 5, a second acceleration opening 16 is already formed separately.

FIG. 7a,b

Figure 7A:
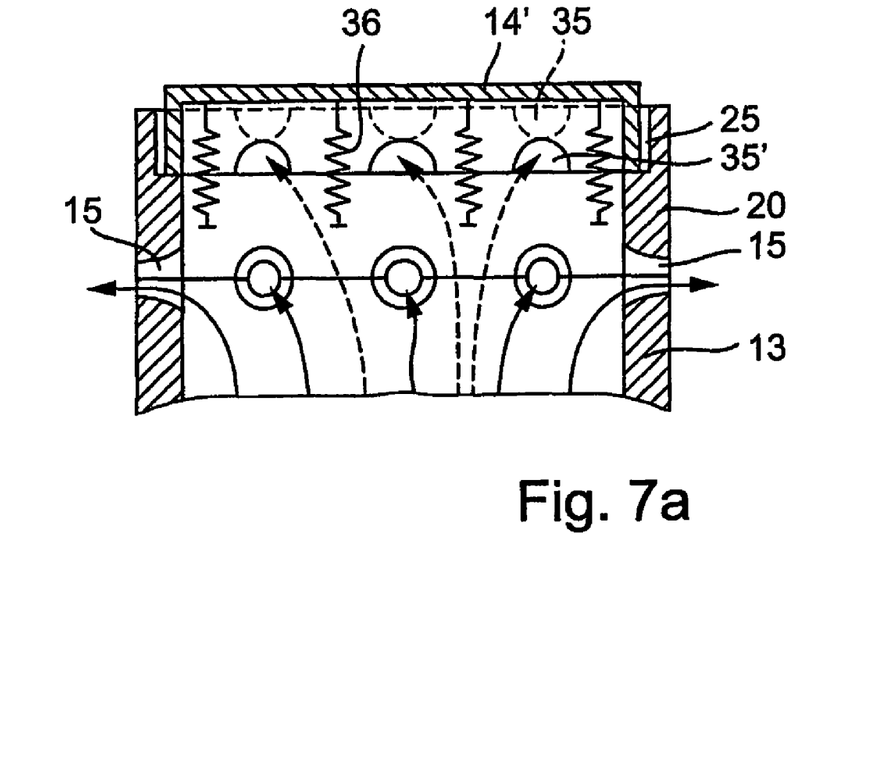
Figure 7B:
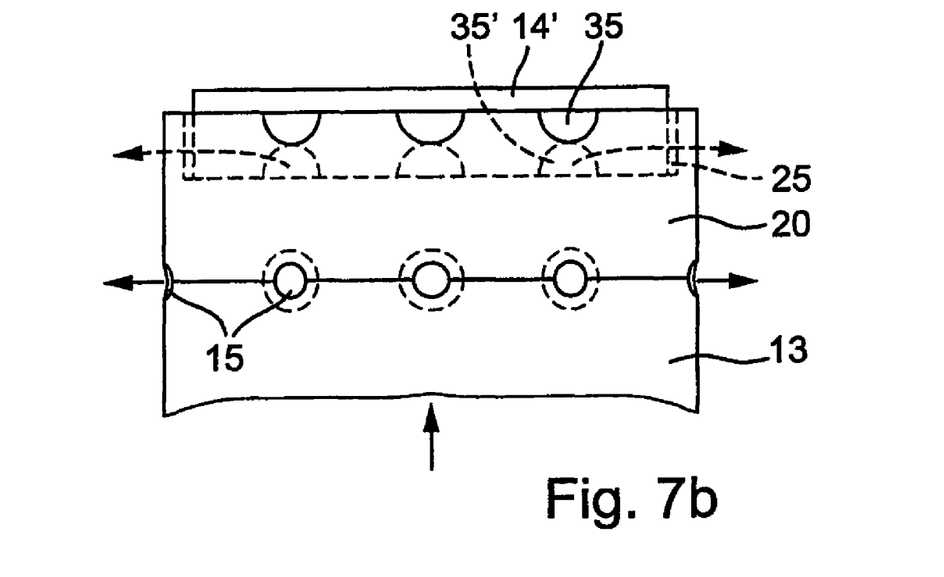

The embodiment according to FIG. 7a,b also differs from that according to FIG. 4 only in the area in which there was already a difference in the embodiment according to FIG. 5 in comparison with the embodiment according to FIG. 4.

The design of the first acceleration openings 15, whose cross section within the cylindrical housing wall 13 is invariable, remains unchanged in the embodiment according to FIG. 7a,b. The change in comparison with FIG. 4 thus consists merely of a different design of the sealing element 14 in conjunction with the ring-shaped end edge area 25 of the cylindrical housing wall 13. In the embodiment according to FIG. 4, a radially peripheral ring gap having the same gap width is created by opening the disk-shaped plate 14', but this is not the case in the embodiment according to FIG. 7. For example, this is achieved in the embodiment according to FIG. 7 specifically by a different type of design of the ring-shaped end edge area 25 of the cylindrical housing wall 13. In the embodiment according to FIG. 7, individual radial groove-like recesses 35 that are open toward the end edge are provided, distributed over the end edge circumference. If the disk-shaped plate 14' remains unchanged in comparison with the embodiment according to FIG. 4, it must be designed in terms of the diameter within the end edge area 25 of the cylindrical housing wall 13 to be able to be displaced axially so that it is radially inside the end edge. Depending on the axial displacement and/or position, the radial recesses 35 are more or less opened with regard to the cross section and thus form a particular partial area of the second acceleration openings 16. These areas, which supplement the partial areas, are provided as radial recesses 35' in the disk-shaped plate 14' in the embodiment shown here. However, it is fundamentally sufficient if radial recesses 35, 35' are provided only in the disk-shaped plate 14' or in the cylindrical housing wall. In the embodiment according to FIG. 7, the helical spring 24 in the embodiment according to FIG. 6 has been replaced for reasons of a simplified schematic diagram by tension springs 36, which have the same effect functionally.

FIG. 8a,b

Figure 8A:
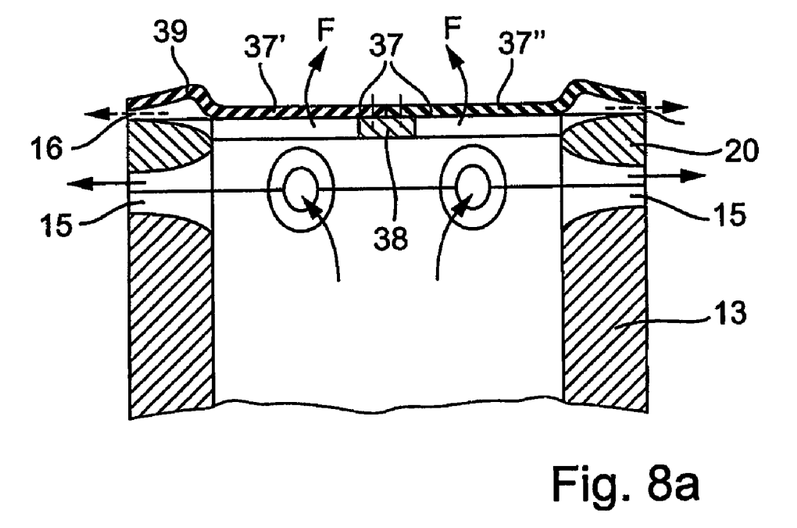

Again, the embodiment according to FIG. 8a,b, differs from that in FIG. 4 only in the area depicted in FIG. 5 through FIG. 7.

The sealing element 14 here is designed as a two-piece plate spring 37, whereby this spring specifically consists of two semicircular plate spring sections 37', 37". Each of these two sections 37', 37" is pivotably secured on a bridge web 38 of the cylindrical housing wall 13, e.g., by screws or rivets in the area of its straight edge. In order to allow second nozzle-like controllable acceleration openings to be formed on the outer circumference of the plate spring 37, individual beading 39 is provided there. The second acceleration openings 16 open with a vacuum that is applied from the outside to the plate spring 37 and is high enough in comparison with the interior of the cylindrical housing wall 13. In opening the second acceleration openings 16, the plate spring sections 37', 37" are pivoted upward about a pivot axis S shown in FIG. 8b according to the arrows F in FIG. 8a.

Figure 8B:
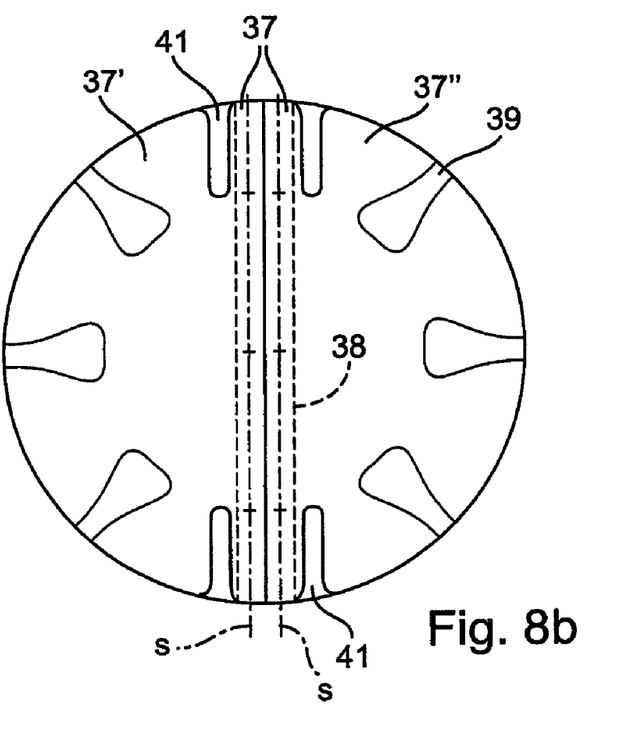

Radial slots 41 are provided in the plate spring sections 37', 37" for targeted establishment of a desired spring constant, each being provided in proximity to the articulated joint of these sections onto the cylindrical housing wall 13.

All the features depicted in the description and in the following claims may be essential to the invention either individually or combined together in any form.

The invention claimed is:

1. A device for separating a gas-liquid mixture, in which the liquid content is in the form of small particles, in ventilation of the crankcase of an internal combustion engine, by separating and coagulating the liquid particles on an impingement surface, which the liquid mixture strikes approximately at a right angle after being accelerated in at least one acceleration opening provided for this purpose, wherein a number and/or cross section of at least one acceleration opening (5, 6; 15, 16) is/are varied as a function of the volume of the mixture between a small total cross section at a low volume flow and a large total cross section at a high volume flow, at least one sealing element (4, 14) that is shifted as a function of volume flow controls the extent to which the flow can pass through the at least one acceleration opening (5, 6; 15, 16) of the device, the at least one acceleration opening (15, 16) passes radially through a cylindrical housing wall (13) that is closable axially on at least one end and is controllable by a sealing element (14) that is displaceable along the axis of the cylindrical housing wall (13), whereby controllability of just a portion of these openings may be sufficient in the case when there are multiple acceleration openings (15, 16), comprising the features a radially peripheral slotted opening representing a radial acceleration opening (16) is provided on an axial end of the cylindrical housing wall (13) on an outgoing flow end, a valve (7) consists of a spring-loaded disk-shaped plate (14') that can close the axial end face of the cylindrical housing wall (13), whereby the spring force acts in the direction of a closing of the valve (7), which counteracts a vacuum prevailing outside of the cylindrical wall (13), acting on the disk-shaped plate (14') in the direction of opening of this valve (7), whereby the degree of opening of this valve (7), the axial slot height, depends on the size of the vacuum.

2. The device according to claim 1, wherein
the disk-shaped plate (14') is designed as a plate spring (37, 37', 37") in one or more parts.

3. The device according to claim 2, wherein
beading (39) forming radial nozzle sections is formed on the outer circumference of the plate spring (37).

4. The device according to claim 2, wherein
the plate spring (37) is pivotably connected with an articulation to the cylindrical housing wall (13).

5. The device according to claim 1, wherein
first acceleration openings (15) whose open cross section is invariable are provided within the cylindrical housing wall (13) distributed axially upstream over the circumference of this housing wall.

6. The device according to claim 5, wherein
a fluid collecting space (21) is arranged beneath the lower end of an impingement ring wall (12),
this device serves to ventilate the crankcase of an internal combustion engine and
is integrated into a housing that comprises a bottom part (18) and a top part (19), whereby
the bottom part (18) has a pot-shaped housing outside wall,
the cylindrical housing wall (13) having the at least one acceleration opening (15, 16) protrudes centrally into the interior of the housing bottom part (18) from its bottom,
the interior of the cylindrical housing wall (13) communicates through the bottom of the housing bottom part (18) with an inlet channel (8) for oil mist to be received,
the housing top part (19) contains an impingement ring wall (12),
an annular space (27) in the housing bottom part (18) surrounds the space taken up centrally by the cylindrical housing wall (13) and the impingement ring wall (12) over approximately the entire height of the housing bottom part (18),
an oil separation space situated radially between the impingement ring wall (12) and the cylindrical housing outside wall (13) with at least one acceleration opening (15, 16) communicates with the annular space (27) of the housing bottom part (18),
the at least one acceleration opening (15, 16) is situated in an axially upper area of the housing bottom part (18) and the access to the annular space (27) is situated in an axially lower area thereof,
the housing top part (19) contains an air outlet channel (9) that communicates with the annular space (27) of the housing bottom part (18)
wherein
a pressure regulating valve (29) through which the air is to pass is provided inside the housing upper part (19) in the flow path between the annular space (27) of the bottom part (18) and the outlet channel (9), at least portions thereof being integrated into the housing top part (19) in one piece.

7. The device according to claim 6, wherein
the pressure regulating valve (29) comprises a spring-loaded diaphragm (31), whereby the diaphragm is exposed to the pressure difference between the pressure prevailing inside the oil mist separator on the one hand and the atmosphere on the other hand.

8. The device according to claim 7, wherein
the diaphragm (31) is allocated to the open axial end of cup (29') communicating with the outlet channel (9), its open inlet cross section controlling it, whereby this diaphragm is acted up by the spring force in the direction of opening from the interior of the cup (29').

9. The device according to claim 8, wherein
the spring action emanates from a helical compressive spring (32).

10. The device according to claim 1, wherein,
a fiber material is designed as a nonwoven.

11. A device for separating a gas-liquid mixture, in which the liquid content is in the form of small particles, in ventilation of the crankcase of an internal combustion engine, by separating and coagulating the liquid particles on an impingement surface, which the liquid mixture strikes approximately at a right angle after being accelerated in at least one acceleration opening provided for this purpose, wherein
a number and/or cross section of at least one acceleration opening (5, 6; 15, 16) is/are varied as a function of the volume of the mixture between a small total cross section at a low volume flow and a large total cross section at a high volume flow,
at least one sealing element (4, 14) that is shifted as a function of volume flow controls the extent to which the flow can pass through the at least one acceleration opening (5, 6; 15, 16) of the device,
the at least one acceleration opening (15, 16) passes radially through a cylindrical housing wall (13) that is closable axially on at least one end and is controllable by a sealing element (14) that is displaceable along the axis of the cylindrical housing wall (13), whereby controllability of just a portion of these openings may be sufficient in the case when there are multiple acceleration openings (15, 16),
comprising the features
a radially peripheral slotted opening representing a radial acceleration opening (16) is provided on an axial end of the cylindrical housing wall (13) on an outgoing flow end,
a valve (7) consists of a spring-loaded disk-shaped plate (14') that can close the axial end face of the cylindrical housing wall (13), whereby the spring force acts in the direction of a closing of the valve (7), which counteracts a vacuum prevailing outside of the cylindrical wall (13), acting on the disk-shaped plate (14') in the direction of opening of this valve (7), whereby the degree of opening of this valve (7), the axial slot height, depends on the size of the vacuum,
wherein at least one acceleration opening (16) is situated in a housing wall area which is covered on one side of this opening by a flexible diaphragm (14''') designed in the form of a plate, its outside wall forming an annular gap with an axial gap height between a maximum value and a minimum value down to 0 as a function of the volume flow, whereby this annular gap leads radially outward from a housing wall area covered by the diaphragm (14''').

* * * * *